(12) United States Patent
Walters et al.

(10) Patent No.: US 6,220,413 B1
(45) Date of Patent: Apr. 24, 2001

(54) RETRACTABLE CABLE REEL

(75) Inventors: Mark D. Walters, Azle; Todd E. Mitchell, Watauga; Kevin L. Morgan, Paradise, all of TX (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/421,169

(22) Filed: Oct. 19, 1999

(51) Int. Cl.[7] .................................................... H02G 11/00
(52) U.S. Cl. ............................................................. 191/12.4
(58) Field of Search .......................... 191/12 R, 12.2 R, 191/12.4, 12.2 A

(56) References Cited

U.S. PATENT DOCUMENTS

| | | | |
|---|---|---|---|
| 2,393,138 | * | 1/1946 | Borkoski ........................ 191/12.2 R |
| 2,393,511 | * | 1/1946 | Beede .............................. 191/12.2 R |
| 2,561,556 | * | 7/1951 | Bell ..................................... 191/12.4 |
| 4,467,979 | * | 8/1984 | Koehler ............................... 191/12.4 |
| 4,489,223 | * | 12/1984 | Rickett et al. ................... 191/12.2 R |
| 4,946,010 | * | 8/1990 | Dibono ............................ 191/12.2 R |
| 5,332,171 | | 7/1994 | Steff . |
| 5,797,558 | | 8/1998 | Peterson et al. . |

* cited by examiner

Primary Examiner—Mark T. Le

(57) ABSTRACT

A cable storage device has a reel rotatably mounted in a frame. The reel has a hub that rotates with the reel. A connector panel has a plurality of connectors for interconnecting with an end of the cable on the reel. The connector panel will fit on a reel docking station for rotation with the reel. The connector panel also fits on a frame docking station while the reel is not to be rotated. A locking member is engaged by the connector panel when the connector panel is mounted to the reel docking station to allow rotation of the reel. The locking member is biased to a locking position when the connector panel is removed from the reel docking station. A cable presence sensor locks the reel against rotation if substantially all of the cable is pulled from the reel.

17 Claims, 5 Drawing Sheets

RETRACTABLE CABLE REEL

BACKGROUND

This invention relates to a reel for storing and extending cable, particularly for fiber optic cable.

Fiber optic cables are utilized for transmitting digital data between computers and for telecommunications purposes. For example, in a local area network, fiber optic cables may extend from a server to work stations in various rooms or cubicles within an office. If the office is to be moved, the fiber optic cable must normally be rewired in the new facility. Rewiring may be required even when cubicles are rearranged. Fiber optic cables are also utilized for interconnecting main telecommunication closets to temporary or satellite closets. Other occasions arise when fiber optic cable is temporarily deployed, such as for special events, trade shows, broadcasts and conferences. Fiber optic cable is expensive and it would be desirable to be able to reuse the cable after such usage.

SUMMARY OF INVENTION

An apparatus is provided for retracting and extending a length of cable, particularly fiber optic cable. The apparatus includes a frame with a reel rotatably mounted to the frame for storing cable. A connector panel having a plurality of terminals interconnects one end of the cable with lines leading to various equipment. A reel docking station is located on the reel for rotation with it. When mounted to the reel docking station with the line to the electrical equipment disconnected, the connector panel will rotate with the reel.

The apparatus includes a locking member that prevents rotation of the reel unless the connector panel has been placed on the reel docking station. The connector panel locking member has a locked position that engages the reel with the frame to prevent rotation of the reel. It has an unlocked position that allows rotation of the reel relative to the frame. While being mounted to the reel docking station, the connector panel engages the locking member and moves the locking member to the unlocked position. A spring moves the locking member to the locked position when the connector panel is removed from the reel docking station.

Also, the apparatus has a cable presence sensor that is mounted to the reel for sensing the presence of cable on the reel. The cable presence sensor has a locked position that engages the frame with the reel to prevent rotation of the reel relative to the frame while it is not sensing cable on the reel. The cable presence sensor is moved to an unlocked position when cable is located on the reel. The cable sensor reduces the chance for a technician unwinding all of the cable from the reel and subjecting the end of the cable at the reel to excessive bending.

DETAILED DESCRIPTION OF THE INVENTION

Figure 1:
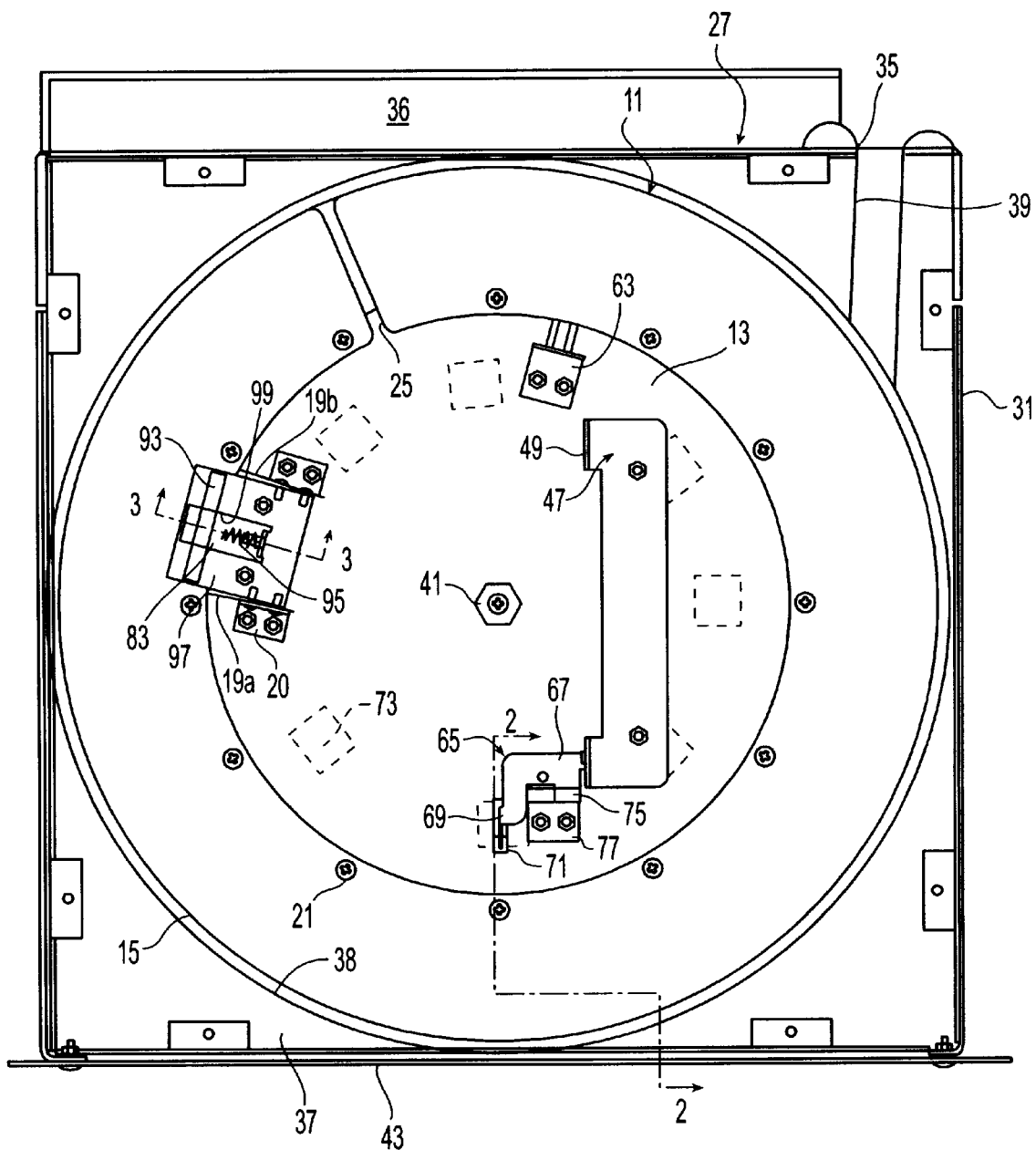
FIG. 1 is a top view of an apparatus constructed in accordance with this invention, with a protective cover removed.
Figure 2:
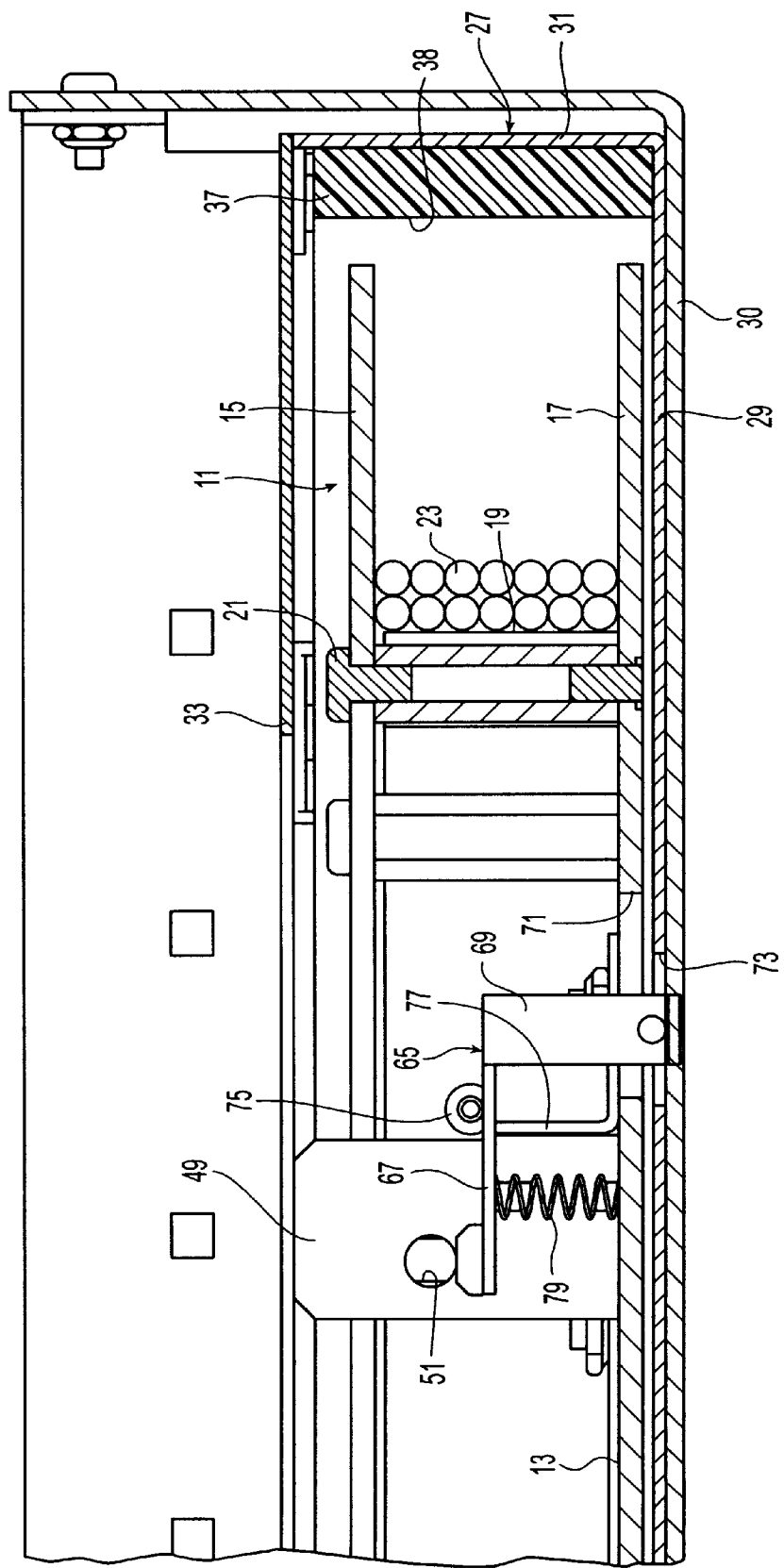
FIG. 2 is an enlarged sectional view of the apparatus of FIG. 1, taken along the line 2—2 of FIG. 1.

Referring to FIG. 1, the cable storing apparatus includes a reel 11. Reel 11 has a hub 13 that is a flat disc. As shown in FIG. 2, a pair of parallel flanges 15, 17 extend from hub 13 radially outward, relative to an axis of rotation of reel 11. Upper flange 15, as shown in FIG. 2, is spaced above lower flange 17. Lower flange 17 is the outer portion of hub 13, being integrally formed with it. Flanges 15 and 17 have the same outer diameters. In the embodiment shown, hub 13 and flanges 15 and 17 are made of a transparent plastic. A cylindrical perimeter wall 19 encircles hub 13 at the inner diameter of flange 15. Perimeter wall 19 extends between flanges 15, 17 and has ends 19a, 19b (FIG. 1). Brackets 20 (FIG. 1) retain ends 19a, 19b and are mounted to hub 13. Flange 15 is secured to hub 13 by a plurality of fasteners 21 located radially inward from perimeter wall 19. A cable 23 (not shown in FIG. 1), such as fiber optic cable, wraps around perimeter wall 19 between flanges 15, 17.

Referring again to FIG. 1, reel 11 is rotatably mounted in a housing or frame 27. Frame 27 is rectangular, having a baseplate 29 (FIG. 2) and four sidewalls 31. In the embodiment shown, baseplate 29 is located above a bottom 30 and is a stationary part of frame 27. Alternately, baseplate 29 could be the bottom of frame 27. A cover 33 (FIG. 5) locates over the top of frame 27 parallel to baseplate 29. One of the sidewalls 31 has an access port 35 for passage of the fiber optic cable 23 (FIG. 2). A storage area 36 may be located adjacent access port 35 for storing a lead end or pulling eye of cable 23. Storage area 36 is a rectangular compartment located outside of frame 27 in the embodiment shown.

A backing material 37, such as rigid polystyrene foam, fills the spaces between sidewalls 31 and the perimeter of reel 11. Backing 37 has concave inner sides 38 that closely fit next to the perimeter of reel 11 for preventing any movement of the wraps of cable 23 (FIG. 2) outside of reel 11. A channel 39 extends through backing 37 from entry port 35 to reel 11 for providing access for cable 23. A polygonal rod 41 extends from the axis of hub 13 for rotation with reel 11. Rod 41 has flat sides for receiving a conventional socket of a socket wrench that is used to rotate reel 11 relative to frame 27. An axle or spindle (not shown) extends between hub 13 and bottom 30 of frame 27 to enable rotation of reel 11.

Figure 5:
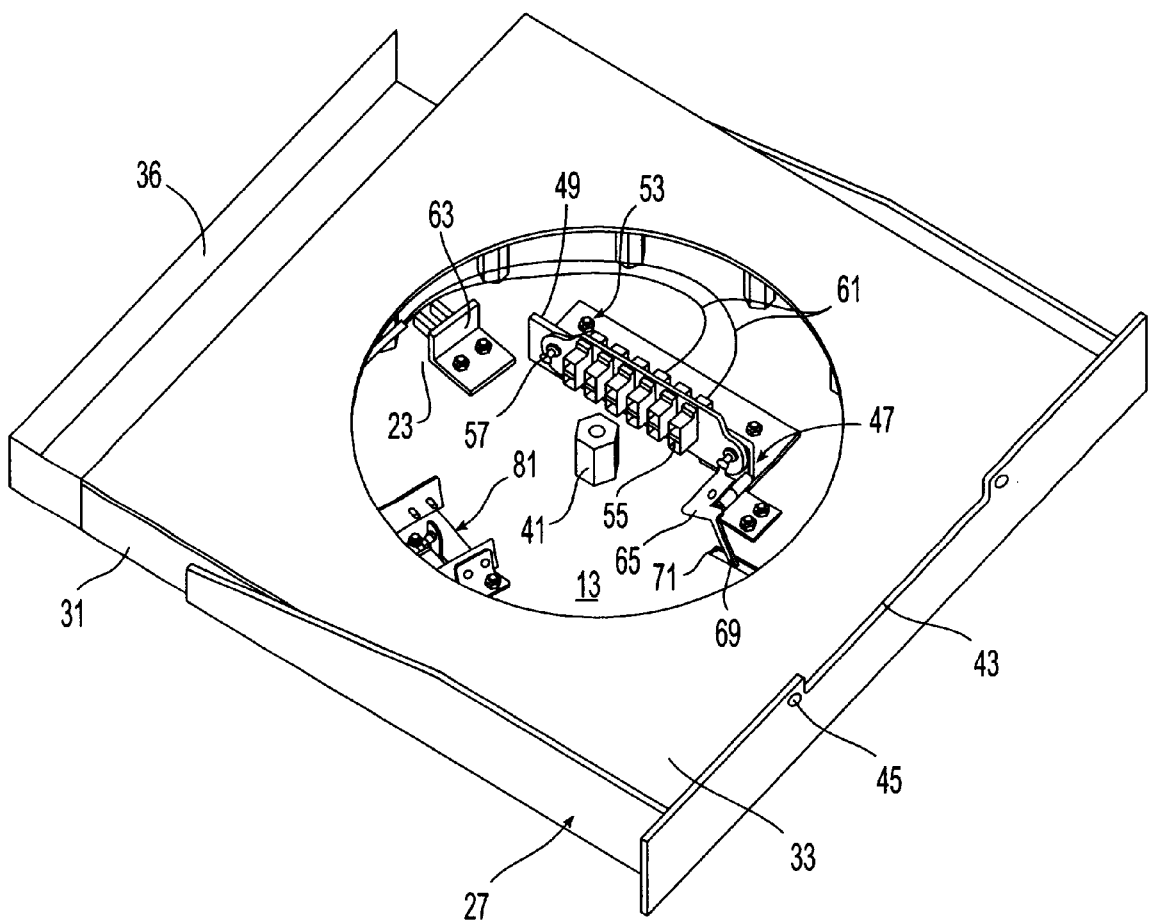
FIG. 5 is an isometric view of the apparatus of FIG. 1, with the cover installed and with a connector panel located on a reel docking station.
Figure 6:
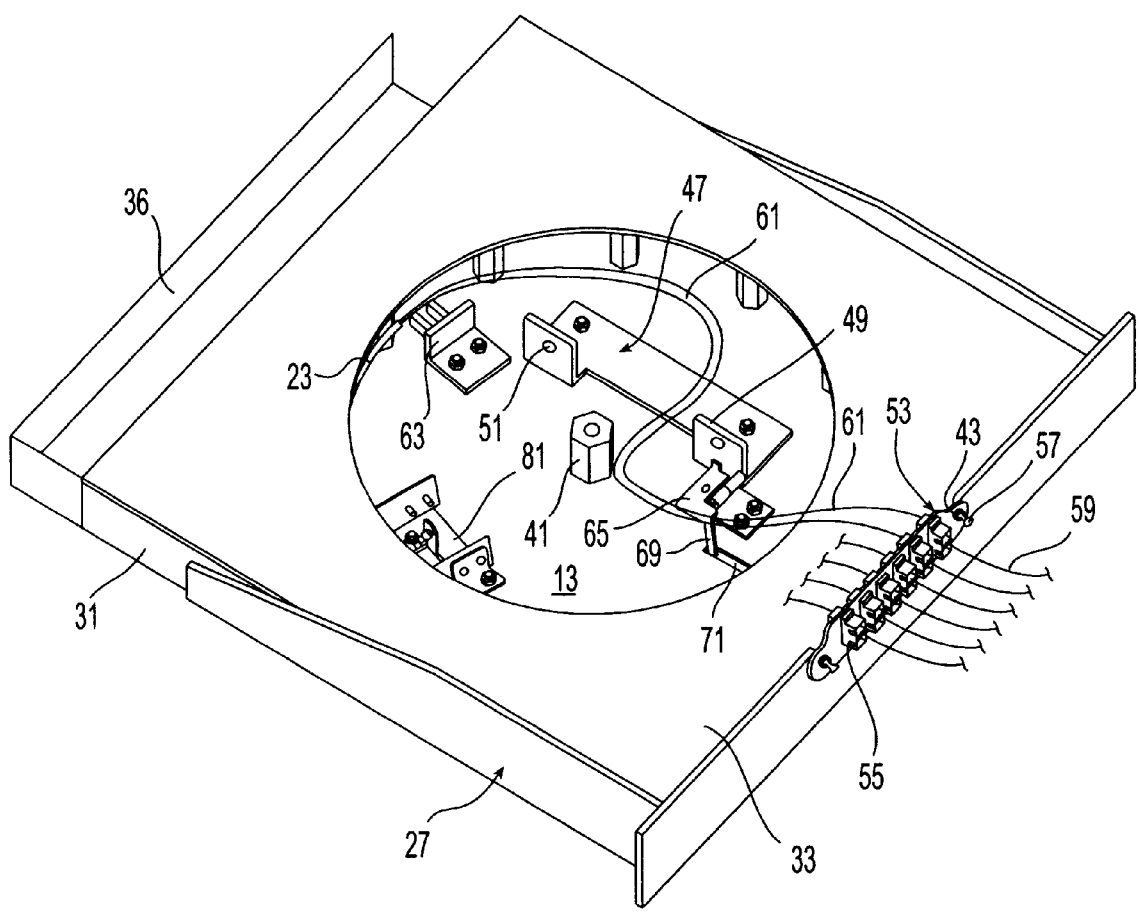
FIG. 6 is an isometric view similar to FIG. 5, but showing the connector panel located on a frame docking station.

Referring to FIG. 5, frame 27 has a docking station 43 located on an upper edge of one of the sidewalls 31. Docking station 43 is a rectangular recessed area halfway between the ends of one of the sidewalls 31. Docking station 43 also includes two fastener holes 45, one on each side. Referring to FIGS. 1 and 6, a reel docking station 47 is mounted to hub 13 for rotation with reel 11. Reel docking station 47 is a flat plate having two spaced apart tabs 49 that protrude orthogonally from hub 13. Each tab 49 has a fastener hole 51.

A connector panel 53 (not shown in FIG. 1) is adapted to fit selectively on frame docking station 43 as shown in FIG. 6 or reel docking station 47 as shown in FIG. 5. Connector panel 53 comprises a flat plate having a plurality of fiber optic connector sleeves or terminals 55 mounted to it. Connector panel 53 has two quick release push-pull fasteners 57 that releasably engage either holes 45 (FIG. 5) in frame docking station 43 or holes 51 of reel docking station 47.

Normally, each connector sleeve 55 has two receptacles on each side. Each receptacle on an outer side of each connector sleeve 55 is adapted to receive a male plug connector on the end of a fiber optic line 59. Lines 59 are part of a cable (not shown) that leads to equipment in the vicinity of reel 11. For example, the equipment might include a server or telecommunications equipment in a telecommunications closet. Each connector sleeve 55 has two receptacles on an inner side that receive male plug connectors on the ends of fibers 61 from fiber optic cable 23. Typically, there will be six pairs of fibers 61, one pair for each of the connectors 55. Only two of the fibers 61 are shown in FIGS. 5 and 6. Fibers 61 are secured to a fan out member (not shown) which mounts to a retainer 63 on hub 13. The individual fibers 61 are sheathed by an elastomeric jacket within cable 23, but fanned out into individual coated lines from retainer 63 to connector panel 53. Care must be taken to avoid excessive bending.

While connector panel 53 is mounted to the frame docking station 43, as shown in FIG. 6, if one attempts to rotate reel 11, damage might occur to cable 23. Consequently, when rotation is desired, connector panel 53 must be moved to the position shown in FIG. 5 on reel docking station 47. In this position, reel 11 may be rotated to extend or retract cable 23. When placed in this position, lines 59 (FIG. 6) must first be removed from connector sleeves 55.

Returning again to FIG. 1, a locking member 65 serves to prevent inadvertent rotation of reel 11 while connector panel 53 (FIG. 6) is located on frame docking station 43. Locking member 65 has a platform 67 that is generally parallel with hub 13 while in the locked position shown in FIG. 1. Locking member 65 is mounted so that platform 67 will be next to one end of reel docking station 47. Locking member 65 has a finger 69 that extends downward into a slot 71 formed in hub 13. Finger 69 is in a plane perpendicular to platform 67. A plurality of apertures 73 are spaced in a circular array in baseplate 29 (FIG. 2). Apertures 73 will register with slot 71 as reel 11, along with hub 13 and locking member 65, rotate. As shown in FIG. 2, once aligned, finger 69 may extend into one of the apertures 73. This locks reel 11 to frame 29, substantially preventing any relative rotation. Locking member 65 is pivotal about a hinge 75, shown in FIG. 1. Hinge 75 is located between platform 67 and finger 69. Hinge 75 is mounted on a bracket 77 that is secured to hub 11. A spring 79 (FIG. 2) urges platform 67 away from hub 13. Movement of the end of platform 67 away from platform 13 causes finger 69 to move into one of the apertures 73 in frame 27. When connector panel 55 is placed in reel docking station 47, it will depress platform 67, causing locking member finger 69 to move upward to the unlocked position. When connector panel 55 is removed from reel docking station 47, spring 79 moves locking member finger 69 back to the locked position in one of the apertures 73.

Figure 3:
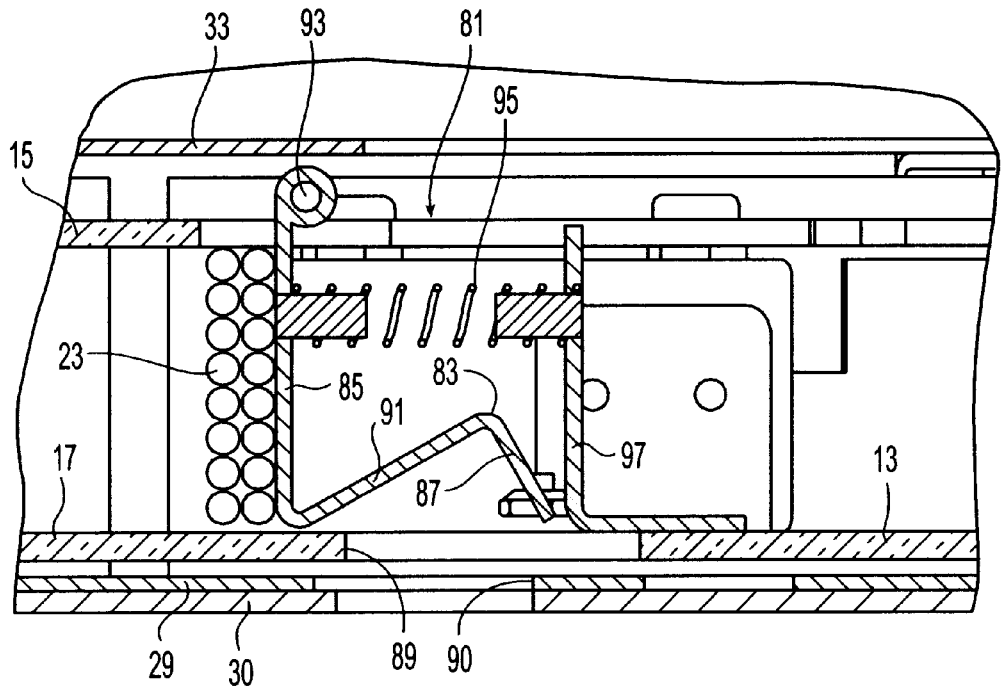
FIG. 3 is an enlarged sectional view of the apparatus of FIG. 1, taken along the line 3—3 of FIG. 1.
Figure 4:
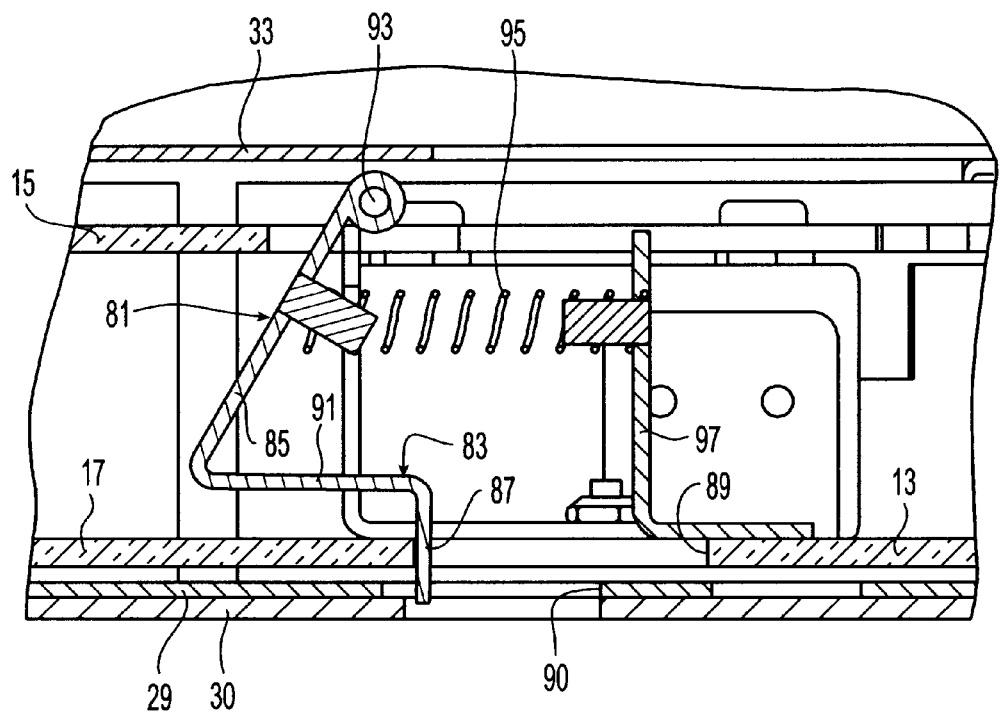
FIG. 4 is a sectional view similar to FIG. 3, but showing the position of a cable sensor when able is not located on the reel.

Referring to FIGS. 1 and 3, the apparatus also has a cable sensor 81 for sensing the presence of cable 23 (FIG. 3) within reel 11. Cable sensor 81 includes an angle member 83 that is pivotally mounted to hub 11 next to flanges 15, 17. The portion of perimeter wall 19 (FIG. 2) between ends 19a, 19b (FIG. 1) is open, and angle member 83 is inserted into the opening. Angle member 83 has a first portion 85 that when in the position shown in FIG. 3 will align substantially with the adjacent edges of perimeter wall 19 (FIG. 2). Cable 23, when wrapped around reel 11, will thus overlie the outer side of angle member first portion 85. Angle member 83 also has a second portion 87 that is adapted to extend through a slot 89 in hub 13 and into aligned apertures 90 in base plate 29 and bottom 30. Base plate 29 and bottom 30 each have only one aperture 90. When moved to the position in FIG. 4, second portion 87 will pivot over into engagement with apertures 90 when aligned with slot 89. An interconnecting portion 91, which is at an acute angle relative to first portion 85, joins first portion 85 to second portion 87.

First portion 85 is pivotally mounted to a hinge 93. A spring 95 pushes against first portion 85, urging angle member 83 to rotate counterclockwise about hinge 93. Spring 95 thus urges angle member 83 to the locked position shown in FIG. 4. If cable 23 is not present, the force of spring 95 will cause it to move to the locked position of FIG. 4, with second portion 87 engaging apertures 90 once aligned. This prevents reel 11 from continuing to rotate after nearly all of the cable 23 has been pulled from reel 11. In a circumferential counterclockwise direction, cable sensor 81 is located between cable retainer 63 and cable entry port 35. Apertures 90 are spaced a selected distance circumferentially from cable port 35 to assure that a portion of cable 23 will be wrapped around hub perimeter wall 19 (FIG. 2), preferably about 270 degrees, when cable sensor 81 moves to the locked position. Cable sensor 81 thus assures that a partial wrap of fiber cable 23 will always be extending around a portion of hub perimeter wall 19 (FIG. 2), avoiding an excessive bend that might otherwise occur if all of the cable 23 is pulled from reel 11.

Referring again to FIG. 1, the remaining portion of cable sensor 81 includes a base plate 97 that has an opening 99. Angle member 83 locates within opening 99 and is pivotal relative to base plate 97. Base plate 97 is secured to hub 13 by a fasteners. Spring 95 extends between a portion of base plate 97 and angle member 83.

In operation, cable 23 (FIG. 2) will be wrapped around perimeter wall 19, preferably at the factory. The direction of wrapping is counterclockwise when viewed as shown in FIG. 1. The proximal end of cable 23 will be fanned out, with individual fibers 61 being secured to connector panel 53 as shown in FIG. 5. Connector panel 53 will be mounted to reel docking station 47. At the user site, frame 27 will be mounted to a conventional storage rack used for fiber optic telecommunications and computer equipment. With the connector panel 53 mounted to the reel docking station 47, locking member 65 will be in the unlocked position, with its finger 69 (FIG. 2) out of engagement with one of the apertures 73. Cable sensor 81 will also be in the unlocked position because reel 11 is wrapped with cable 23.

The technician will then take the remote or pulling eye end of the cable from storage compartment 36 (FIG. 1) and begin pulling the cable 23 to the remote site. While unwinding cable 23, if substantially all of cable 23 is pulled from reel 11, cable sensor 81 will sense the last wrap of cable 23 being removed from reel 11. Angle member 83 will pivot from the unlocked position in FIG. 3 to the locked position in FIG. 4. Once angle member 83 enters apertures 90 (FIG. 4), continued rotation of reel 11 relative to frame 27 ceases. At the remote site, the technician will connect the remote end to various electrical equipment. At reel 11, the technician will remove connector panel 53 from reel docking station 47 and mount it to frame docking station 43 as shown in FIG. 6. The technician then connects lines 59 to connectors 55. Lines 59 lead to various electrical equipment in the proximity of reel 11.

To respool cable 23, the technician will remove lines 59 from connectors 55 and move connector panel 53 to reel docking station 47 as shown in FIG. 5. The downward movement of connector panel 53 at reel docking station 47 pushes against locking member 65, causing it to move to the unlocked position shown in FIG. 5. The technician then rotates reel 11 by using a socket wrench on rod 41, winding cable 23 back onto the reel 11.

The invention has significant advantages. It allows fiber optic cable to be safely extended and retracted about a reel. This allows fiber optic cable to be easily reused when offices are moved or cubicles within offices are moved. It allows cable to be reused when connected to temporary satellite closets. The extensible cable reel is useful for network connections for special events, trade shows, broadcasts and conferences, allowing reuse without significant exposure to damage.

While the invention has been shown in only one of its forms, it should be apparent to those skilled in the art that it is not so limited, but it is susceptible to various changes without departing from the scope of the invention. For example, although reel has been shown particularly for use with fiber cable, it could also be used with copper conductor cable.

We claim:

1. An apparatus for retracting and extending a length of cable, comprising:
    a frame;
    a reel for storing cable rotatably mounted to the frame;
    a connector panel having at least one connector for interconnecting a proximal end of the cable on the reel with a line leading to electrical equipment;
    a reel docking station on the reel for rotation therewith, the connector panel being removably mounted to the reel docking station, allowing the connector panel to be rotated with the reel while the line to the electrical equipment is disconnected; and
    a connector panel locking member having a locked position engaging the reel with the frame for preventing rotation of the reel relative to the frame and an unlocked position that allows rotation of the reel relative to the frame, and wherein mounting the connector panel to the reel docking station moves the connector panel locking member to the unlocked position and removing the connector panel from the reel docking station moves the connector panel locking member to the locked position.

2. The apparatus according to claim 1, further comprising a frame docking station on the frame for removably mounting the connector panel to the frame while the line is connected to the connector panel.

3. The apparatus according to claim 1, wherein the reel has a hub that rotates with the reel, and the reel docking station is mounted to the hub.

4. The apparatus according to claim 1, wherein:
    the reel has a hub that rotates with the reel;
    the hub has a plurality of apertures;
    a portion of the frame is located adjacent the apertures;
    the reel docking station is mounted to the hub;
    the connector panel locking member is pivotally mounted to the hub and has a finger that inserts through one of the apertures into engagement with said portion of the frame while the connector panel locking member is in the locked position;
    a spring urges the connector panel locking member to the locked position; and
    the connector panel contacts the connector panel locking member and pivots it to the unlocked position while being mounted to the reel docking station.

5. The apparatus according to claim 1, further comprising:
    a cable presence sensor mounted to the reel for sensing the presence of the cable on the reel, the cable presence sensor having a locked position that is adapted to engage the frame with the reel to prevent rotation of the reel relative to the frame while not sensing the cable on the reel, the cable presence sensor having an unlocked position that is adapted to allow rotation of the reel relative to the frame while sensing the presence of the cable on the reel.

6. The apparatus according to claim 1, wherein the reel has a hub and a pair of spaced apart flanges extending generally radially outward from a perimeter of the hub relative to an axis of rotation of the reel, and wherein the apparatus further comprises:
    a cable presence sensor mounted to the reel, the cable presence sensor having a first portion adapted to be contacted by the cable as the cable wraps between the flanges, and a second portion that is adapted to protrude through an aperture provided in the reel into engagement with the frame while the cable is not contacting the first portion, defining a locked position that prevents rotation of the reel relative to the frame, the second portion adapted to be disengaged from the frame while the first portion is contacted by the cable; and
    the cable presence sensor has a spring that urges the cable presence sensor to the locked position.

7. The apparatus according to claim 1, wherein the frame comprises a rectangular enclosure.

8. The apparatus according to claim 1, wherein:
    the reel has a circular perimeter;
    the frame comprises a rectangular enclosure having four side walls; and wherein the apparatus further comprises:
        a backing located in the enclosure between the side walls and the perimeter of the reel for retaining the cable within the reel.

9. The apparatus according to claim 1, further comprising a shaft protruding from the reel along an axis of rotation of the reel, the shaft having a polygonal surface for being engaged by a tool for rotating the reel.

10. An apparatus for retracting and extending a length of cable, comprising:
    a frame;
    a reel for storing cable rotatably mounted to the frame, the reel having a hub that rotates with the reel, the hub having a plurality of apertures;
    a connector panel having a plurality of connectors for interconnecting a proximal end of the cable on the reel with lines leading to electrical equipment;
    a reel docking station mounted on the hub for rotation therewith, the connector panel being removably mountable to the reel docking station, allowing the connector panel to be rotated with the reel while on the reel docking station and the lines to the electrical equipment are disconnected from the connectors;
    a frame docking station mounted on the frame, the connector panel being removably mountable to the frame docking station while the lines to the electrical equipment are connected to the connectors;
    a locking member mounted to the hub adjacent the reel docking station, the locking member having a platform that is contacted by the connector panel while the connector panel is mounted to the reel docking station, the locking member having a finger that protrudes through one of the apertures in the hub into engagement with the frame for preventing rotation of the reel relative to the frame while the connector panel is removed from the reel docking station, defining a locked position that prevents rotation of the reel relative to the frame; and wherein the locking member has a spring that urges the locking member to the locked position.

11. The apparatus according to claim 10, wherein the locking member is pivotal relative to the hub about a pivot point, with the platform being on one side of the pivot point and the finger being on an opposite side of the pivot point.

12. The apparatus according to claim 10, wherein the reel has a pair of spaced apart flanges extending generally radially outward from a perimeter of the hub relative to an axis of rotation of the reel, and wherein the apparatus further comprises:

a cable presence sensor mounted to the reel, the cable presence sensor having a first portion adapted to be contacted by the cable as the cable wraps between the flanges, and a second portion adapted to protrude through a hole provided in the hub into engagement with the frame while the cable is not contacting the first portion, defining a locked position that prevents rotation of the reel relative to the frame, the second portion adapted to be disengaged from the frame while the first portion is contacted by the cable; and the cable presence sensor having a spring that urges the cable presence sensor to the locked position.

13. The apparatus according to claim 10, wherein:

the reel has a circular perimeter;

the frame comprises a rectangular enclosure having four side walls; and wherein the apparatus further comprises:

a backing located in the enclosure between the side walls and the perimeter of the reel for retaining the cable within the reel.

14. The apparatus according to claim 10, further comprising a shaft protruding from the hub along an axis of rotation of the reel, the shaft having a polygonal surface for being engaged by a tool for rotating the reel.

15. A method for connecting remote electrical equipment with proximal electrical equipment, comprising:

(a) providing a reel with a reel docking station and a locking member;

(b) rotatably mounting the reel to a frame, wherein the locking member has an unlocked position out of engagement with the frame to allow rotation of the reel relative to the frame, and a locked position engaging the frame to prevent rotation of the reel relative to the frame;

(c) winding cable around the reel;

(d) connecting a proximal end of the cable to a connector panel;

(e) mounting the connector panel on a reel docking station provided on the reel and simultaneously engaging the locking member with the connector panel to move the locking member to the unlocked position; then (f) rotating the reel, unwinding at least a portion of the cable; then (g) connecting a remote end of the cable to remote electrical equipment, removing the connector panel from the reel docking station, thereby causing the locking member to move to the locked position, and connecting a line leading to proximal electrical equipment to the connector panel.

16. The method according to claim 15, further comprising:

mounting a cable presence sensor to the reel that has a first portion that senses the presence of cable on the reel and a second portion having a locked position that automatically locks the reel against rotation in the absence of cable being on the reel; and during step (f) if substantially all of the cable is unwound from the reel such that the first portion of the cable presence sensor ceases to sense the presence of cable on the reel, moving the second portion of the cable presence sensor to the locked position.

17. The method according to claim 16, further comprising: biasing the locking member and the cable presence sensor to the locked positions.

* * * * *